United States Patent Office 3,301,889
Patented Jan. 31, 1967

---

3,301,889
2-METHYL-2(β-CYANOETHYL)-1,3-CYCLOPENTANEDIONE
Richard E. Brown, Hanover, and Robert I. Meltzer, Rockaway, N.J., assignors to Warner-Lambert Pharmaceutical Company, Morris Plains, N.J., a corporation of Delaware
No Drawing. Filed Sept. 19, 1963, Ser. No. 310,146
1 Claim. (Cl. 260—464)

This invention relates to certain novel cyclopentanedione derivatives. More particularly, this invention relates to 2-methyl-2(β-substituted ethyl)-1,3-cyclopentanediones of the formula:

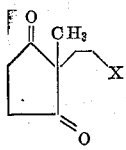

wherein X represents cyano,

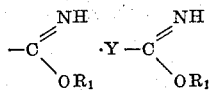

in which $R_1$ represents lower alkyl such as methyl, ethyl, propyl, butyl and the like, and Y can be an acid salt-forming moiety such as hydrochloride, hydrobromide, hydroiodide, hydrogen sulfate and the like, or X may be

in which $R_2$ is hydrogen or lower alkyl and relates also to a novel process for the production of these cyclopentanedione derivatives.

The novel compounds of this invention are important starting materials in the total synthesis of compounds of steroid structure and configuration. They are particularly valuable as starting material for the production of compounds of 8-azasteroid structure. Thus, for example, 2-methyl-2(β-carboxyethyl)-1,3-cyclopentanedione may be condensed with a substituted phenylalkylamine such as m-methoxyphenylethylamine to produce a compound of the formula:

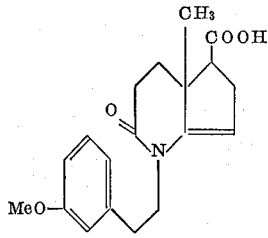

The above intermediate is then cyclized by refluxing with phosphorous oxychloride to produce an 8-azasteroid of the formula:

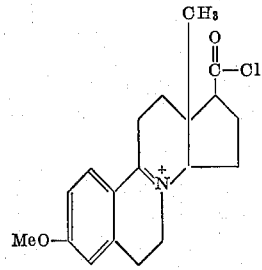

Compounds of the above 8-azasteroid structure have interesting and valuable pharmacological activity and are useful as therapeutic agents. For example, they have been used in reversing circulatory collapse, drug induced or otherwise and for supplementing certain hormonal, such as estrone or testosterone, deficiencies.

We have found that the novel compounds of this invention may be produced by reacting 2-methyl-1,3-cyclopentanedione or other 2-lower alkyl substituted cyclopentanedione with acrylonitrile. This reaction, as represented in the following equation, gives a compound wherein the substitutent X is cyano.

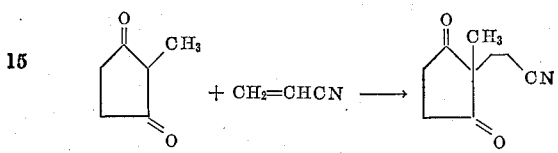

This reaction is preferably carried out in the presence of a dilute base such as 0.2 N NaOH or other dilute base to give a pH range between 10 to 14 to avoid rupturing of the starting material or the final product.

The 2-cyanoethyl substituted cyclopentanedione can be treated further to give other compounds of this invention.

Thus, the corresponding 2-(β-carboxyethyl) derivative may be produced by hydrolyzing the corresponding cyano derivative in an acidic medium. The carbethoxy or carbomethoxy substituted derivatives may in turn be produced by esterification of the 2-(β-carboxyethyl) compound with a lower aliphatic alcohol such as ethanol or methanol. The esters can also be prepared directly from the cyano compound via the formation of an imino chloride and imino ether by reacting the cyano compound with dry hydrogen chloride in methanol or ethanol followed by hydrolyzing.

The following examples are included in order further to illustrate the invention. All temperatures are in degrees centigrade.

*Example 1.—Preparation of 2-methyl-2-(β-cyanoethyl)-1,3-cyclopentanedione*

To a mixture of 160 ml. of standard 1 N NaOH solution and 352 ml. water is added 113.6 g. (1.024 mols) of 2-methyl-1,3-cyclopentanedione. The mixture is heated with stirring for 10 minutes on the steam bath. There is then added all at once a solution of 256 g. (5.12 mols) of freshly distilled acrylonitrile in 320 ml. of reagent grade dioxane. The clear solution is heated to reflux with stirring whereby a precipitate soon forms. The mixture is refluxed with stirring for 25 hours, cooled and the solid polymer which forms is filtered off, washed several times with a dioxane-water mixture in the above ratio, and the combined filtrates are then acidified with 40 ml. of 4 N HCl. The solution formed is then concentrated under high vacuum to a mixture of solid and oil. This mixture is slurried in ethyl acetate, and the solid is then filtered off and washed with a little ethyl acetate. The solid product separated weighs 42 g. and consists of a mixture of the starting dione and polymer. The ethyl acetate filtrate is diluted with chloroform, dried with $MgSO_4$ and concentrated to give 87 g. of oil containing a trace of solid. This oil is distilled to give 75 g. of 2-methyl-2-(β-cyanoethyl)-1,3-cyclopentanedione which is obtained as a pale yellow oil, B.P. 140°/.2 mm.

*Example 2.—Preparation of 2-methyl-2-(β-carboxyethyl)-1,3-cyclopentanedione*

A solution of 128 g. of 2-methyl-2-(β-cyanoethyl)-1,3-cyclopentanedione in 600 ml. absolute methanol is saturated at 0° with dry hydrogen chloride and the solution left overnight at 0°–10°. The solution is evaporated under reduced pressure (aspirator) at 25° or lower, and the semisolid residue dissolved in 1.2 liters of 1 N HCl. This solution is warmed for ½ hour on the steam bath. Crystallization starts on cooling. The crystalline slurry is extracted with ethyl acetate, the ethyl acetate washed twice with water, dried, and evaporated under reduced pressure to a solid residue of 2-methyl-2-(β-carboxyethyl)-1,3-cyclopentanedione. The product is recrystallized from benzene and the recrystallized product has a M.P. 122°–124°.

*Example 3.—Preparation of 2-methyl-2-(β-carbethoxyethyl)-1,3-cyclopentanedione*

A solution of 5.8 g. of 2-methyl-2-(β-cyanoethyl)-1,3-cyclopentanedione in 20 ml. absolute ethanol is saturated at 0° with dry hydrogen chloride, and left overnight at 0°–10°. The solution is evaporated at 25° or lower to a semisolid residue. This is dissolved in 10 ml. of water, left for 1 hour at room temperature, and the oil extracted from the aqueous phase with ether. The ether extract is dried over magnesium sulfate and the ether removed by distillation. The residue is distilled to give 2-methyl-2-(β-carbethoxyethyl)-1,3-cyclopentanedione as a pale yellow oil, B.P. 140°–142°/4 mm. $n_D^{20}=1.4678$.

*Example 4.—Preparation of 2-methyl-2-(β-carbomethoxyethyl)-1,3-cyclopentanedione*

In the same way as described in Example 3, 5.8 g. of 2-methyl-2-(β-cyanoethyl)-1,3-cyclopentanedione in 20 ml. of methanol gives 2-methyl-2-(β-carbomethoxyethyl)-1,3-cyclopentanedione as an off-white oil, B.P. 101°–103°/10 mm.

It is understood that the foregoing detailed description is given merely by way of illustration and that many variations may be made therein without departing from the spirit of our invention.

Having described our invention, what we desire to secure by Letters Patent is:

2-methyl-2-(β-cyanoethyl)-1,3-cyclopentanedione.

References Cited by the Examiner

UNITED STATES PATENTS 2,579,580   12/1951   Howk et al. _____ 260—465.6 XR

OTHER REFERENCES

Setter et al., *Ber.*, vol. 87, 1954, pp. 869–872.

Cyanamid, "The Chemistry of Acrylonitrile," Second ed., 1959 pp. 117–119.

CHARLES B. PARKER, *Primary Examiner.*

JOSEPH P. BRUST, *Examiner.*